United States Patent [19]
Aizikowitz et al.

[11] Patent Number: 5,761,514
[45] Date of Patent: Jun. 2, 1998

[54] REGISTER ALLOCATION METHOD AND APPARATUS FOR TRUNCATING RUNAWAY LIFETIMES OF PROGRAM VARIABLES IN A COMPUTER SYSTEM

[75] Inventors: Nava Arela Aizikowitz, Haifa; Roy Bar-Haim, Neve Monosson, both of Israel; Edward Curtis Prosser, Rochester, Minn.; Robert Ralph Roediger, Rochester, Minn.; William Jon Schmidt, Rochester, Minn.

[73] Assignee: International Business Machines Corporation, Armonk, N.Y.

[21] Appl. No.: 522,052

[22] Filed: Aug. 31, 1995

[51] Int. Cl.$^6$ ............................................. G06F 9/45
[52] U.S. Cl. ............................................. 395/709
[58] Field of Search ........................ 395/705, 706, 395/707, 709, 708

[56] References Cited

U.S. PATENT DOCUMENTS

| | | | |
|---|---|---|---|
| 4,571,678 | 2/1986 | Chaitin et al. | 395/707 |
| 4,782,444 | 11/1988 | Munshi et al. | 395/709 |
| 5,249,295 | 9/1993 | Briggs et al. | 395/709 |
| 5,261,062 | 11/1993 | Sato | 395/705 |
| 5,339,428 | 8/1994 | Burmeister et al. | 395/707 |
| 5,355,494 | 10/1994 | Sistare et al. | 395/706 |
| 5,367,684 | 11/1994 | Smith | 395/709 |
| 5,418,958 | 5/1995 | Goebel | 395/709 |
| 5,530,866 | 6/1996 | Koblenz et al. | 395/708 |
| 5,555,417 | 9/1996 | Odnert et al. | 395/707 |

OTHER PUBLICATIONS

Peter E. Bergner, Peter J. Dahl, and Matthew T. O'Keefe, *Spill Code Minimization Techniques for Graph Coloring Register Allocators*, Unversity of Minnesota Manuscript, Department of Electrical Engineering, 1995.

Preston Briggs, *Register Allocation via Graph Coloring*, PhD Thesis, Rice University, 1992.

Preston Briggs, Keith D. Cooper, and Linda Torczon, *Coloring Register Pairs*, ACM Letters on Programming Languages and Systems, ACM Press, vol. 1, No. 1, Mar. 1992, pp. 3–13.

David Callahan & Brian Koblenz, *"Register Allocation via Hierarchical Graph Coloring"*, Proceedings of the ACM SIGPLAN '91 Conference on Programming Language Design and Implementation, SIGPLAN Notices, vol. 26, No. 6, pp. 192–203 (Jun. 1991).

(List continued on next page.)

*Primary Examiner*—Emanuel Todd Voeltz
*Assistant Examiner*—Peter J. Corcoran, III
*Attorney, Agent, or Firm*—Derek P. Martin; Martin & Associates, L.L.C.

[57] ABSTRACT

A method and apparatus for truncating runaway lifetimes of program variables calculates liveness for each variable based on upwardly exposed uses. Reaching definitions are then calculated for at least the program variables that have runaway lifetimes. The liveness information is compared to the reaching definition information to determine whether a variable that is live upon entry to a basic block has a definition that reaches the end of each predecessor block, or has a use within the basic block. If the reaching definition for a variable reaches the beginning of the block and if there is a predecessor block for which there is no reaching definition, the variable has a runaway lifetime. The variable also has a runaway lifetime if there is a use of the variable in a block without a reaching definition for the variable at the beginning of the block. The runaway lifetime is truncated by inserting an instruction such as a pseudo-definition of the variable into the instruction stream at an appropriate place. Once runaway lifetimes are truncated using this method, subsequent stages of the compiler may calculate liveness by performing a single dataflow analysis which calculates lifetimes based on upwardly exposed uses.

20 Claims, 8 Drawing Sheets

OTHER PUBLICATIONS

Fred C. Chow & John L. Hennessy, *"The Priority-Based Coloring Approach to Register Allocation"*, ACM Transaction on Programming Languages and Systems, vol. 12, No. 4, pp. 501-536 (Oct. 1990).

David Bernstein, Dina Goldin, Martin Golumbic, Hugo Krawczyk, Yishay Mansour, Itai Nahshon and Ron Pinter, *Spill Code Minimization Techniques for Optimizing Compilers*, ACM SIGPLAN Conference on Programming Languages Design and Implementation, 1989.

Preston Briggs, Keith D. Cooper, Ken Kennedy, and Linda Torczon, *Coloring Heuristics for Register Allocation*, ACM SIGPLAN Conference on Programming Languages Design and Implementation, 1989.

Fred C. Chow & John L. Hennessy, *"Register Allocation by Priority-Based Coloring"*, Proceedings of the ACM Symposium on Compiler Construction, pp. 222-232 (Jun. 1984).

Auslander & Hopkins, *An Overview of the PL.8 Compiler*, ACM SIGPLAN Notices, vol. 17, No. 6, Jun. 1982.

Gregory J. Chaitin, *"Register Allocation & Spilling via Graph Coloring"*, Proceedings of the ACM Symposium on Compiler Construction, pp. 98-105 (Jun. 1982).

Gregory J. Chaitin, Marc A. Auslander, Ashok K. Chandra, John Cocke, Martin E. Hopkins and Peter W. Markstein, *Register Allocation via Graph Coloring*, Computer Languages, 6:47-57, 1981.

/* Some Code */

```
        load      R87 = 1
L1:
        mult      R90 = R87, 10
        add       R92 = R87, 10
        mult      R93 = R90, R92
        call      "A" (R93)
        add       R87 = R87, 1
        compare   R87, 100
        b.lt      L1
```

/* More Code */

REGISTER ALLOCATION METHOD AND APPARATUS FOR TRUNCATING RUNAWAY LIFETIMES OF PROGRAM VARIABLES IN A COMPUTER SYSTEM

FIELD OF THE INVENTION

This invention generally relates to computer systems. More specifically, this invention relates to a method and apparatus for efficiently allocating registers in a computer system to program variables in a computer program.

BACKGROUND OF THE INVENTION

The development of the EDVAC computer system of 1948 is often cited as the beginning of the computer era. Since that time, computer systems have evolved into extremely sophisticated devices. However, even today's most sophisticated computer systems continue to include many of the basic elements that were present in some of the first computer systems. One such element is the computer system's processor. A computer system's processor is the intelligent portion of the computer system. The processor is responsible for executing programs that interpret and manipulate information that is given to the computer system by the computer system's user or users.

As is well known, the processor may only operate on data contained within its registers. Designers of processors choose the number of processor registers which will allow the processor to perform well. The number of processor registers in a typical computer system is relatively small compared to the number of program variables in a typical computer program that the processor executes. Thus, the many program variables in a computer program must be allocated to specific processor registers for the processor to appropriately operate on the data.

Each of the program variables that are operated upon in a computer program must be assigned a corresponding processor register. Allocating the fixed number of processor registers to a much larger number of program variables in a computer program is generally referred to as register allocation. The performance of the computer system depends on how efficiently the processor uses its registers, which depends on the efficiency of the register allocation scheme. Therefore, register allocation is critical to the performance of the computer system. One common device that allocates program variables in the computer program to processor registers is commonly referred to as a compiler. Register allocation in a typical compiler uses the concept of live ranges" or lifetimes" of program variables. The live range" or lifetime" of a particular program variable is the span of instructions for which the variable contains valid data, and may be computed in a number of different ways. A lifetime is said to run away" if the method of calculating the lifetime does not detect that the lifetime spans more instructions than is necessary.

Two different approaches for allocating processor registers in modern compilers effectively trade off efficiency of register allocation with compilation time, with one preferring a more efficient register allocation scheme at the expense of a longer compilation time while the other prefers a quicker compilation time at the expense of less efficient register allocation. The first approach minimizes the compilation time by doing as few operations as possible in allocating the processor registers, without accounting for any runaway lifetimes that may exist. By minimizing the number of operations that must be performed, the execution time of the compiler is enhanced. The reduction in operations, however, generally comes at the expense of inefficiencies in allocating the registers due to runaway lifetimes. For example, a runaway lifetime may cause reservation of a processor register for use by a program variable in regions of the program where the register is not needed. This inefficiency can result in poor register allocation since registers appear to be in use when, in fact, they are actually available for use.

A second approach for allocating processor registers slows down compilation time, but has the benefit of eliminating runaway lifetimes. The result is that no processor registers are needlessly reserved for program variables in portions of the porgram where they are not needed. The slower compilation time is a result of performing two dataflow analyses each time the lifetimes are computed.

As described above, the known methods of allocating registers in a compiler suffer from drawbacks. Inefficient register allocation impairs the performance of the processor. Without methods and apparatus for simultaneously improving both the efficiency of register allocation and the compilation time, register allocation will continue to be an impediment to the overall performance of a computer system.

SUMMARY OF THE INVENTION

According to the present invention, a register allocation method and apparatus efficiently allocates the processor registers in a computer system to program variables in a computer program while providing for an improved compilation speed. The registers are more efficiently allocated by detecting runaway lifetimes of program variables in the computer program, and by inserting pseudo-definitions in the intermediate language code which serve to truncate the runaway lifetimes. In this manner, the register allocation is more efficiently performed by freeing up registers that would be unavailable using prior art methods due to runaway lifetimes of program variables. At the same time, the register allocation scheme reduces compilation time by requiring the solution of a single dataflow problem to calculate lifetimes in subsequent stages of the compiler.

The foregoing and other objects, features and advantages of the invention will be apparent from the following more particular description of preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and.

DESCRIPTION OF THE PREFERRED EMBODIMENTS

OVERVIEW

Figure 1:
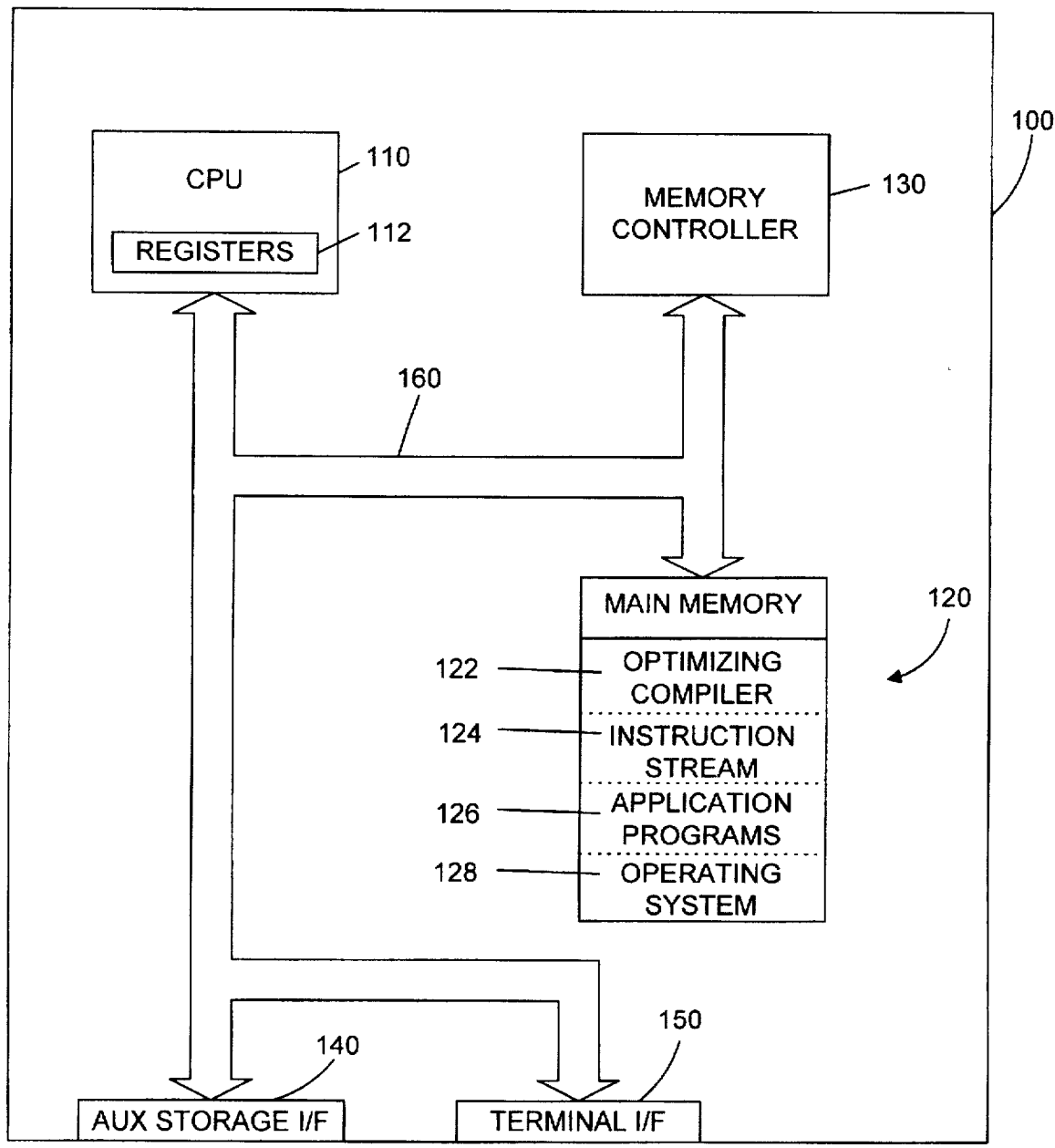
FIG. 1 is a schematic block diagram of a computer system in accordance with the present invention.

The method and apparatus of the present invention has particular applicability to the field of compilers, and specifically to the register allocation methods used in optimizing compilers. For those individuals who are not compiler experts, a brief overview of compilers and various register allocation mechanisms used in compilers is presented here.

Statements, Instructions, Compilers

Computer programs are constructed using one or more programming languages. Like words written in English, a programming language is used to write a series of statements that have particular meaning to the drafter (i.e., the programmer). The programmer first drafts a computer program in human readable form (called source code) prescribed by the programming language, resulting in a source code instruction (or statement) stream. The programmer then uses mechanisms that change the human readable form of the computer program into a form that can be understood by a computer system (called machine readable form, or object code). These mechanisms are typically called compilers; however, it should be understood that the term "compiler", as used within this specification, generically refers to any mechanism that transforms one representation of a computer program into another representation of that program.

This machine readable form, within this specification, is a stream of binary instructions (i.e., ones and zeros) that are meaningful to the computer. The compiler typically compiles each human readable statement into one or more machine readable instructions. Compilers generally translate each human readable statement in the source code instruction stream into one or more intermediate language instructions, which are then converted into corresponding machine-readable instructions. Special compilers, called optimizing compilers, typically operate on the intermediate language instruction stream to make it perform better (e.g., by eliminating unneeded instructions, etc.). Some optimizing compilers are wholly separate while others are built into a primary compiler (i.e., the compiler that converts the human readable statements into machine readable form) to form a multi-pass compiler. In other words, multi-pass compilers first operate to convert source code into an instruction stream in an intermediate language understood only by the compiler (i.e., as a first pass or stage) and then operate on the intermediate language instruction stream to optimize it and convert it into machine readable form (i.e., as a second pass or stage).

A compiler may reside within the memory of the computer which will be used to execute the object code, or may reside on a separate computer system. Compilers that reside on one computer system and are used to generate machine code for other computer systems are typically called cross compilers." The methods and apparatus discussed herein apply to all types of compilers, including cross compilers.

Physical Registers, Symbolic Registers, Lifetimes

During the first pass or stage, one type of known compiler typically assumes that an unlimited number of physical registers are available for the target central processing unit (CPU) to use. Thus, each time a program variable is encountered, it is assigned a new register in the intermediate language. However, in reality, the number of CPU registers is fixed and is typically much smaller than the number of program variables in a typical computer program. Since the registers used in the intermediate language instruction stream have no correlation to physical CPU registers, they are known as symbolic registers. During the second pass or stage, the optimizing compiler typically must allocate a large number of symbolic registers to a much smaller number of physical registers available to the CPU. This process, known as register allocation, is the subject of the method and apparatus of the present invention.

Figure 2:
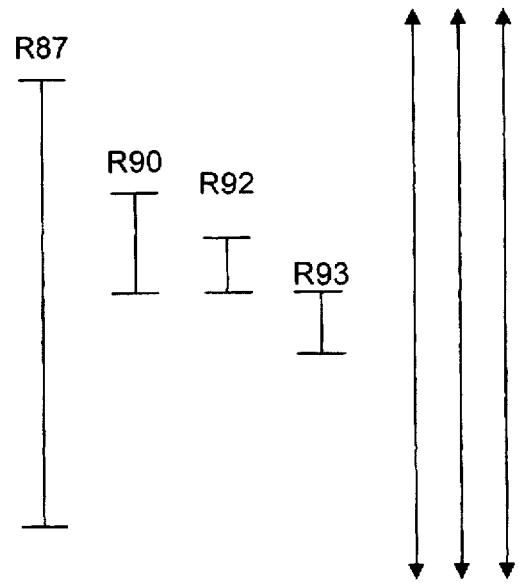
FIG. 2 is an illustration of the lifetimes for symbolic registers in a portion of an intermediate language instruction stream.

As described in the Background of the Invention, register allocation in a compiler typically uses the concept of live ranges" or lifetimes". Both of these terms are used interchangeably in this specification. A live range" for a variable, which may be a variable from the source program or a temporary variable generated by the compiler, is typically defined by a set of instructions for which the value contained in the symbolic register that represents the variable will be used in a subsequent computation. The live range for a variable begins when the variable is defined, and ends at the last use of the variable that occurs before any other definition of the variable. Note that the definition of live range used herein is simplified for purposes of illustrating the concepts of the present invention. For example, a live range may actually contain multiple definitions and last uses for a variable. Those skilled in the art are familiar with the concept of live ranges, and the simplified definition used herein shall not be construed as limiting the application of the present invention. Referring to FIG. 2, the live ranges for variables R87, R90, R92, and R93 are shown by vertical lines to the right of the instruction stream spanning the number of instructions that make up the live range. Note that various other live ranges are live for the entire loop of FIG. 2. The live range for R90 in FIG. 2 begins when R90 is defined (i.e., mult R90=R87, 10), and ends at the last use of R90 (i.e., mult R93=R90, R92).

Register Allocation Mechanisms Using Interference Graphs

A common mechanism for allocating registers in optimizing compilers uses live ranges represented on an interference graph. Each live range is assigned a unique name" (e.g., R87, R90, R92 and R93 in FIG. 2). Each name then becomes a node" on the interference graph, shown in FIG. 3 as a circle. Two live ranges interfere with each other if they overlap, implying that a single physical CPU register could not be used for both live ranges since they are both live (i.e., contain valid data) at the same time. If two live ranges overlap, the live ranges are said to interfere" with each other. The interference between two live ranges (i.e., nodes) is represented on the interference graph by connecting the two nodes that interfere with a line or edge", such as the edge connecting nodes R87 and R90 in FIG. 3. Referring again to FIG. 2, R87 interferes with (i.e., overlaps) R90, R92 and R93; R90 interferes with R87 and R92; R92 interferes with R87 and R90; and R93 interferes with R87. Note that R87, R90, R92, and R93 also interfere with other live ranges shown to the right of FIG. 2, but these interferences are ignored in this discussion to illustrate register allocation mechanisms for a small exemplary portion of an instruction stream. Once the interference graph is complete, all the live ranges are nodes in the graph, and the edges of the graph show the interferences between the live ranges. Now the task remains to assign the limited number of physical CPU registers to the large number of nodes (i.e., symbolic registers) in the interference graph.

Figure 3:
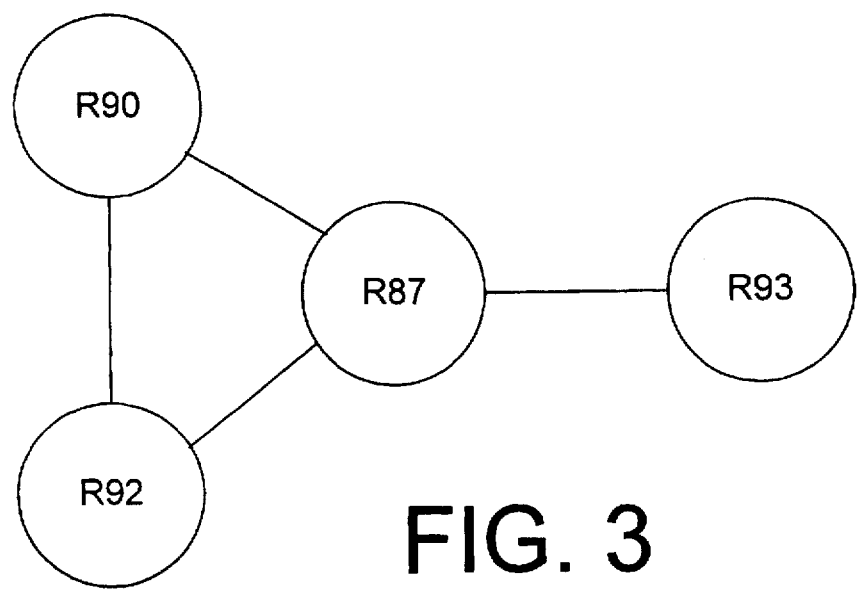
FIG. 3 is an interference graph of the lifetimes shown in FIG. 2.

FIG. 3 represents an interference graph for the live ranges of FIG. 2. A check of the edges associated with each node in FIG. 3 shows that the interference information represented in the interference graph in FIG. 3 is equivalent to the interference information represented by the overlapping live ranges in FIG. 2. If all the live ranges of symbolic registers may be allocated to physical CPU registers, the optimizing compiler produces a machine code instruction stream with a minimal number of loads and stores to memory. Loads and stores to memory take considerably longer than operations to registers, and minimizing the number of loads and stores to memory is thus a primary goal of an optimizing compiler in order to minimize the execution time of the machine code instruction stream. If one or more of the symbolic registers cannot be allocated to a CPU register, the live range must be "spilled", meaning that the live range is allocated to a memory location rather than to a register, and therefore must be loaded into a register from memory before use, and must be written back to memory after being changed. If the live range is spilled, spill code must be added to the intermediate language instruction stream to accomplish the required accesses to memory. The loading and storing of spilled live ranges adds overhead to the machine code instruction stream, slowing its execution time, and slows compilation time due to the insertion of spill code. Therefore, an optimizing compiler typically has a goal of efficiently allocating CPU registers to the highest number of symbolic registers possible, in order to minimize the overhead associated with spill code.

The nodes in an interference graph may be assigned to the smaller number of physical CPU registers using a technique known as graph coloring." Each physical CPU register is assigned a different color. A selected node on the interference graph may be colored with any color that is not used by one of its immediate neighbors (i.e., nodes connected to the selected node with an edge). This coloring scheme works because the edge represents an interference between nodes, which means that the nodes have a conflicting need for a physical register. Since a physical CPU register (color) cannot service two live ranges (nodes) that are live at the same time (i.e., that overlap), a single color cannot be assigned to two nodes connected with an edge. The large number of live ranges may be successfully allocated to the smaller number of physical CPU registers provided that each node in the interference graph may be colored with a color different from all its neighbors. If each node in the interference graph may be assigned a color subject to these constraints, the graph is colorable."

Some interference graphs may not be colorable due to the number and/or arrangement of interferences between the nodes. If a node has a number of incident edges equal to or greater than the number of available colors, the node is constrained", and may not be colored if all the available colors are used by its neighbors. If a node has fewer incident edges than available colors, the node is unconstrained", since there is at least one color left which may be assigned to the node. An interference graph with all unconstrained nodes is inherently colorable. However, an interference graph that has one or more constrained nodes may or may not be colorable. If the graph is not colorable, the number of physical CPU registers corresponding to colors cannot adequately service the number of symbolic registers without modification of the intermediate language (e.g., introducing spill code to reduce the need for physical CPU registers). If the graph is colorable, the number of physical CPU registers (colors) is adequate for the live ranges (nodes) in the computer program. However, whether or not the graph is colorable is a function of the number of interferences between nodes. By minimizing the number of interferences, the chances of coloring more nodes in the interference graph increase.

Register Allocation Mechanisms for Compilers

Figure 4:
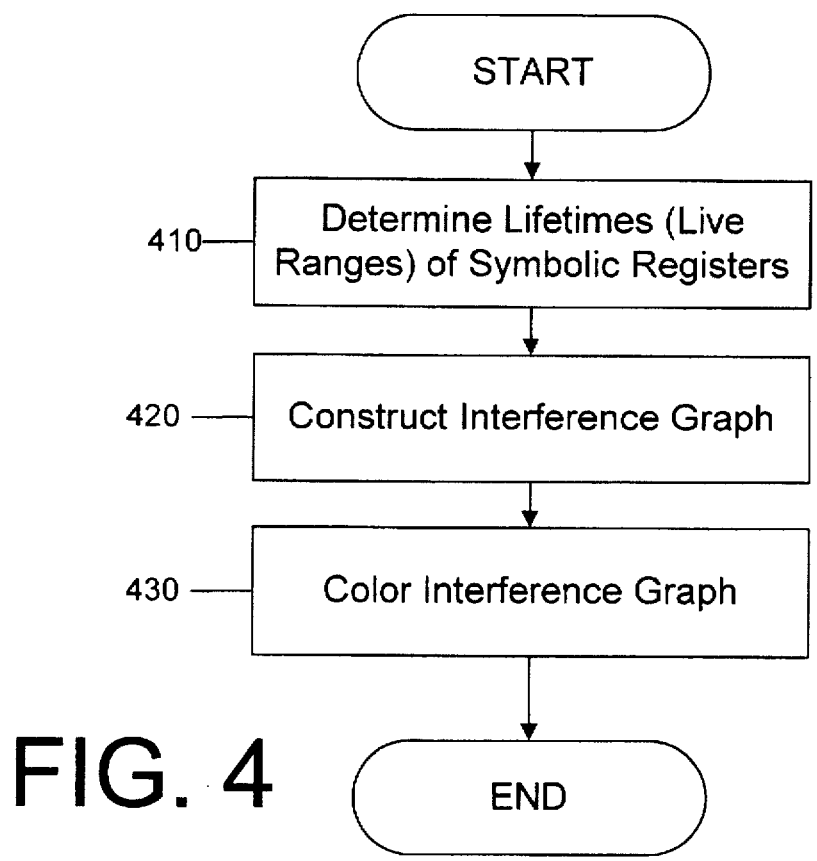
FIG. 4 is a flow diagram of a suitable register allocation method used in an optimizing compiler.

A well-known mechanism for allocating registers in an optimizing compiler was developed by Gregory J. Chaitin of IBM, as disclosed in U.S. Pat. No. 4,571,678 "*Register Allocation and Spilling Via Graph Coloring*" (issued Feb. 18, 1986 to Chaitin and assigned to IBM); Gregory J. Chaitin et al., "*Register Allocation Via Coloring*", Computer Languages, Vol. 6, p. 47–57 (1981); and Gregory J. Chaitin, "*Register Allocation & Spilling Via Graph Coloring*", SIGPLAN '82 Symposium on Compiler Construction, SIGPLAN Notices, Vol. 17, No. 6, p. 98–105 (June 1982); which are all incorporated herein by reference. Chaitin's register allocation mechanism operates on an intermediate language instruction stream, i.e., the instruction stream that results from one or more early passes or stages of an optimizing compiler. Referring now to FIG. 4, the first step is to calculate the lifetimes or live ranges of the symbolic registers in the intermediate language instruction stream (step 410). The lifetimes of the various symbolic registers are then compared, interferences are identified, and an interference graph is constructed (step 420). In the interference graph, each name is represented by a node in the graph, and the interferences are represented by edges between nodes. The interference graph is then colored (step 430) to assign physical CPU registers to the live ranges in the interference graph.

An improvement to the Chaitin register allocation scheme was proposed in a paper by Preston Briggs et al., "*Coloring Heuristics for Register Allocation*", Proceedings of the SIGPLAN '89 Conference on Programming Language Design and Implementation, ACM Press, Vol. 24, No. 7, p. 275–284 (July 1989), which is incorporated herein by reference. The primary difference between Chaitin and Briggs is in the coloring of the interference graph (step 430). Both Chaitin and Briggs use the same method of determining lifetimes (step 410), as discussed below.

Figure 5:
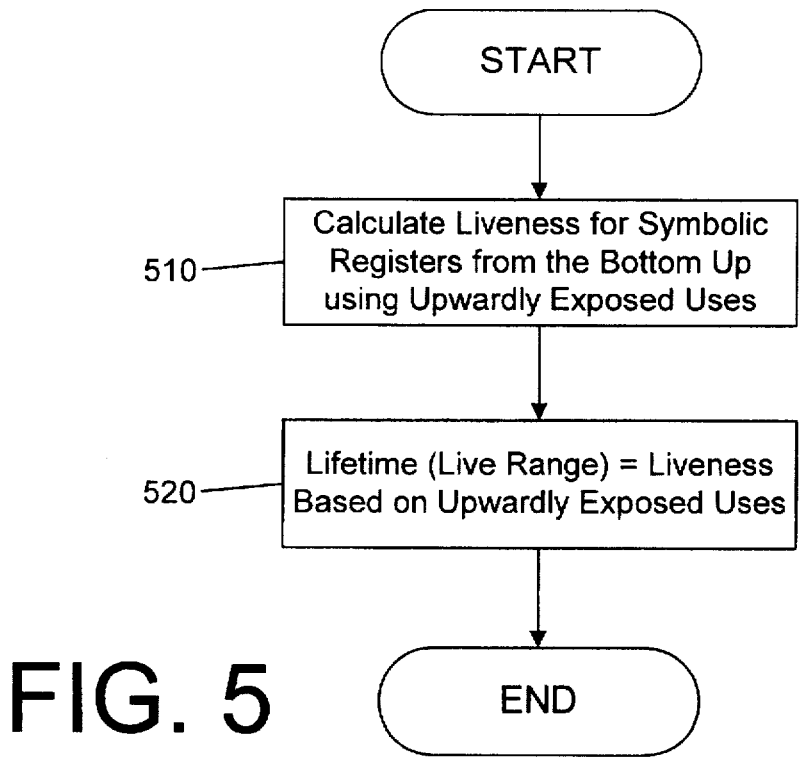
FIG. 5 is a flow diagram of a first suitable method for calculating lifetimes of program variables in accordance with the register allocation method of FIG. 4.

Referring to FIG. 5, according to Chaitin and Briggs, the lifetimes within an intermediate language instruction stream are determined using a single backwards dataflow analysis. Chaitin and Briggs both compute liveness for a symbolic register based on upwardly exposed uses of that register (step 510). Progressing up the program flow from bottom to top, for any particular point of interest in the program flow, a use of a symbolic register X is upwardly exposed if there are no definitions of X between the use below and the point of interest. The lifetime (live range) are the span of instructions in the program where a use of the variable is upwardly exposed (step 520).

One specific method of calculating lifetimes for symbolic registers parses the program into basic blocks, and determines liveness for each symbolic register at the beginning and end of each basic block. The term basic block" is well known in the art, and represents a maximal sequence of straight-line code. The liveness information is represented using two liveness bit vectors for each basic block in the intermediate language stream, one representing liveness at the beginning of the basic block, and the other representing liveness at the end of the basic block. For the purposes of this specification, liveness corresponds to upwardly exposed uses for each symbolic register. While one or more of the basic blocks may contain live ranges that begin and end within the same basic block, these live ranges are ignored for the purposes of this discussion since they do not, by definition, have runaway lifetimes. One skilled in the art will realize that the discussion herein is concerned with determining which of the lifetimes span several blocks and potentially have runaway lifetimes, and will realize that the small live ranges that are confined within basic blocks must also be represented on the interference graph prior to coloring, even though these live ranges within basic blocks are not discussed herein.

Each liveness bit vector has one bit for each symbolic register in the intermediate language instruction stream, and a one in a given position in the liveness bit vector indicates that the corresponding symbolic register is live" at that particular point in the program. A symbolic register is live" if there exists an anticipated use of the symbolic register along some forward path with no intervening definition of the symbolic register. The intermediate language instruction stream is traversed using a backwards dataflow analysis, until the two liveness bit vectors for each basic block have been computed. For the register allocation schemes of Chaitin and Briggs, the lifetime of the symbolic register is defined as the span of liveness for each symbolic register as determined from the liveness bit vectors (i.e., upwardly exposed uses of a symbolic register)(step 520). By equating the liveness (based on upwardly exposed uses) to lifetime, both Chaitin and Briggs succeed in calculating lifetime by performing a single dataflow problem, thereby increasing execution speed of the compiler when compared to schemes that require solving two or more dataflow problems. Note, however, that this advantage in compiler speed comes at the expense of less efficient register allocation due to runaway lifetimes.

A runaway lifetime for a program variable occurs for the Chaitin/Briggs method of computing lifetimes (FIG. 5) when there is an upward path in the program along which a variable (e.g., symbolic register) that has been used is not defined. A variable may be undefined due to programmer error, or may be undefined in one path of the program if the program flow assures the undefined path will never be executed. Note, however, that determining whether or not a given branch of the program will ever be executed is an undecidable problem for the compiler, so the compiler must assume that all combinations of flow paths through the program are valid. If any of the upward paths from a use of the variable do not define the variable for whatever reason, the lifetime for the variable may extend from the use of the variable all the way up to the beginning of the program. Any variable that is live at the beginning of the program is necessarily a runaway lifetime, since at the beginning of the program no variables have been defined. Runaway lifetimes cause false interferences to be entered into the interference graph, which increases register pressure and may lead to uncolorable nodes that would be otherwise colorable if the runaway lifetimes were truncated (i.e., cut off) to more appropriate lengths. Truncation of runaway lifetimes thus results in removing false constraints (i.e., unnecessary edges) from the interference graph. Since Chaitin and Briggs do not address the issue of runaway lifetimes, their register allocation scheme is inherently less efficient than a more optimal case where runaway lifetimes are appropriately truncated.

Figure 6:
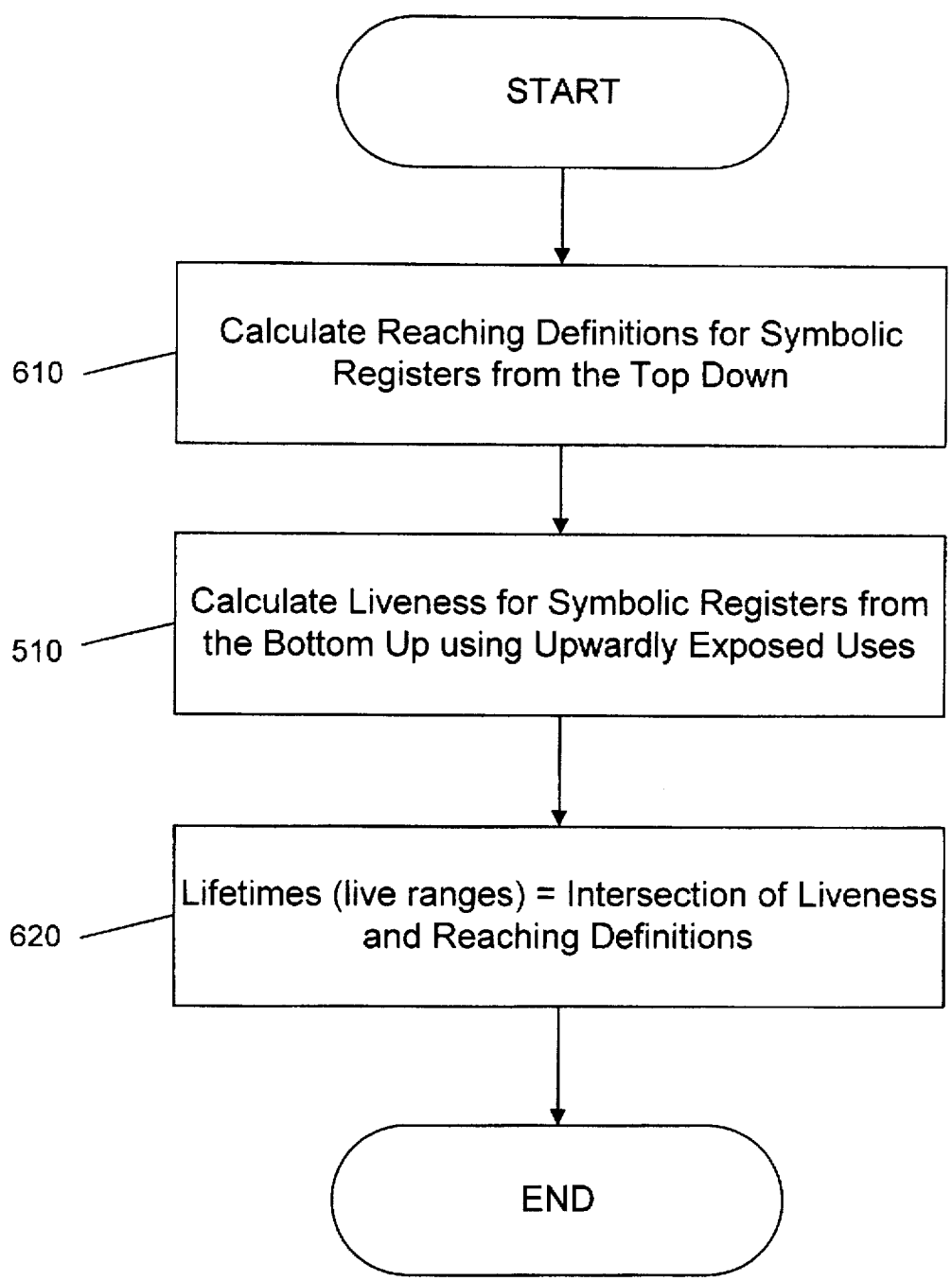
FIG. 6 is a flow diagram of a second suitable method for calculating lifetimes of program variables in accordance with the register allocation method of FIG. 4.

Other known methods of register allocation do not equate liveness based on upwardly exposed uses to lifetimes. For example, a different register allocation scheme was proposed in Fred C. Chow & John L. Hennessy, *The Priority-Based Coloring Approach to Register Allocation", ACM Transaction on Programming Languages and Systems, Vol. 12, No. 4*, p. 501–536 (October 1990); and in Fred C. Chow & John L. Hennessy, *Register Allocation by Priority-Based Coloring",* Proceedings of the ACM Symposium on Compiler Construction, p. 222–232 (June 1984); which are incorporated herein by reference. Referring to FIG. 6, the Chow/Hennessy approach of computing liveness information determines upwardly exposed uses in the same manner as Chaitin and Briggs described above (step 510). In addition, the Chow/Hennessy approach also performs an additional dataflow analysis to compute all reaching definitions at the beginning and end of each basic block (step 610). A definition of a program variable reaches" a particular point in the instruction stream (i.e., the particular point has a reaching definition for that program variable) if there is a definition for the program variable along any backwards path that reaches down to the particular point of interest. To compute reaching definitions, Chow must therefore assign two more bit vectors to each basic block corresponding to the reaching definitions at the beginning and end of the block. Once the two dataflow analyses (steps 610 and 510) have been completed, the information in the liveness bit vectors and reaching definitions bit vectors are used to determine the lifetimes of the symbolic registers. According to Chow/Hennessy, the lifetime or live range of a symbolic register is defined by the intersection of the ranges of upwardly exposed uses and reaching definitions. By computing the reaching definitions for all symbolic registers, and defining the live range as the intersection of upwardly exposed uses and reaching definitions, the Chow/Hennessy approach succeeds in truncating runaway lifetimes. Note, however, that this comes at the expense of performing two dataflow analyses during each stage of the compiler that must compute the live ranges of the symbolic registers. Live ranges are used not only in register allocation, but also in other compiler stages such as dead code elimination and instruction scheduling. The compiler that allocates registers based on the Chow/Hennessy scheme will spend a great deal of time re-calculating the live ranges (i.e., lifetimes) during each of these subsequent stages, thereby increasing compilation time. Thus, the Chow/Hennessy scheme succeeds in truncating runaway lifetimes, thereby increasing the efficiency of register allocation, but does so at the expense of reduced compiler speed.

Figure 7:
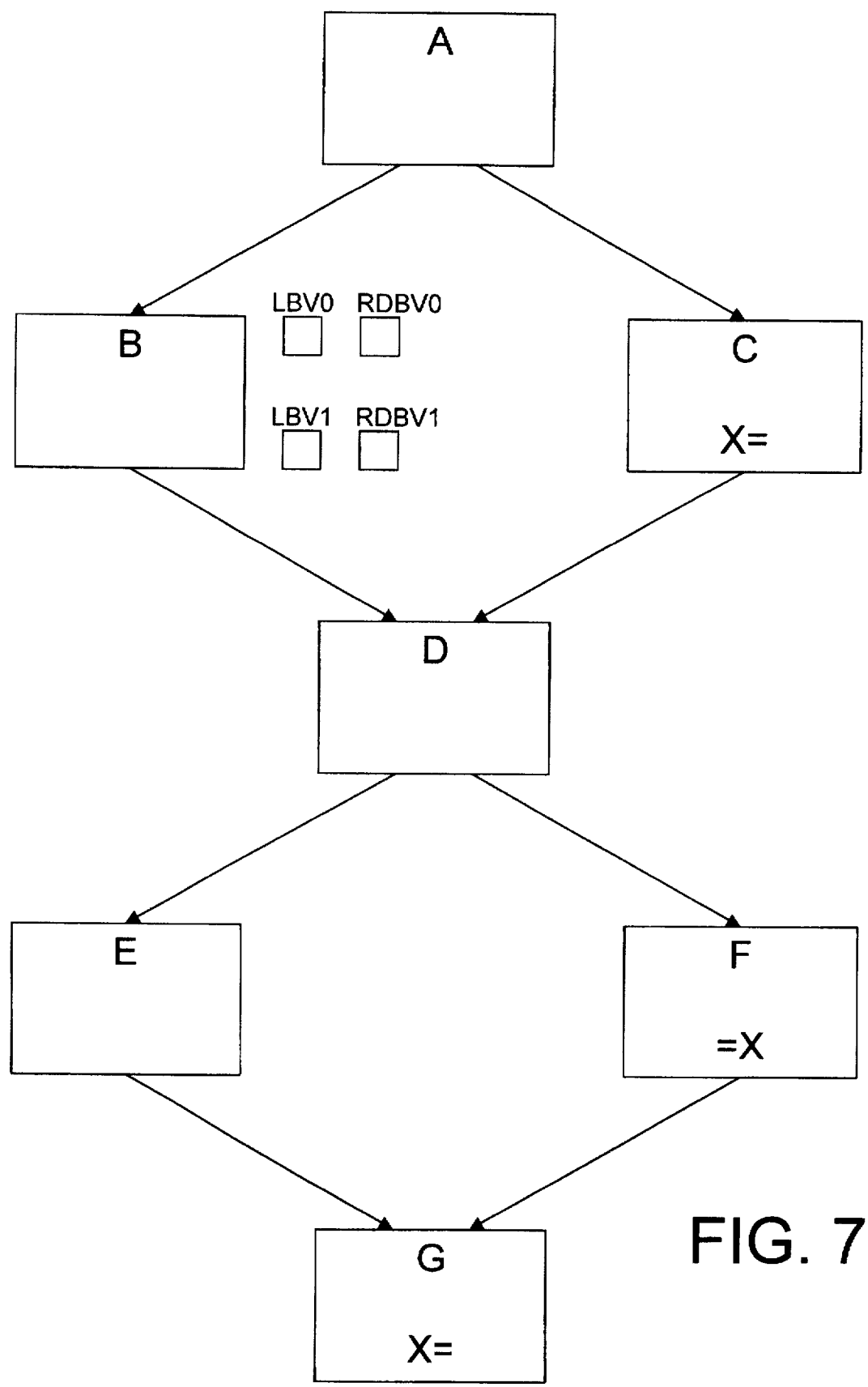
FIG. 7 is a basic block representation of the program flow of an exemplary computer program.

The Chaitin/Briggs approach of calculating lifetimes may be compared with the Chow approach by looking at a small hypothetical structure of basic blocks of intermediate language instructions as shown in FIG. 7. For the simplistic example shown in FIG. 7 for the sake of illustration, seven basic blocks (A–G) of intermediate language instructions are arranged as shown, and only one symbolic register X is considered. In blocks C and G there are definitions of X, while a use of X is found in block F. The upwardly exposed uses for each symbolic register may be determined by calculating the two liveness bit vectors for each basic block. For the simplistic example of FIG. 7, the liveness bit vector comprises a single bit (LBV0) at the beginning of each block and a single bit (LBV1) at the end of each block, since a single symbolic register (i.e., X) is considered in this specific example. FIG. 7 shows for basic block B the liveness bit vectors LBV0 and LBV1, along with reaching definition bit vectors RDBV0 and RDBV1, but these bit vectors also exist (although not shown in FIG. 7) for each basic block in the program. Starting at the bottom of the flow diagram, the liveness bit vector corresponding to the bottom of block G is first computed. The appropriate question in determining the value of the liveness bit vector is whether there is an anticipated use of X along some forward path from the point in question before encountering a definition of X. Assuming that basic block G is the last basic block in the program (as shown in FIG. 7), no symbolic registers will be live at the end of block G, since this is the end of the program, and thus there will be no forward paths to consider. The liveness bit vector for the bottom of block G is therefore a zero, indicating that X is not live at that point in the program.

Next the liveness of X at the top of block G is considered. There is no anticipated use of X in the forward path (comprising block G), so the liveness bit vector at the beginning of block G is also zero. Working up the flow diagram, either block E or block F may be considered next, and block E is arbitrarily selected. The liveness of X at the end of block E is zero since the one forward path (i.e., block G) has no use of X. Since there are no uses of X in block E, the liveness bit vector at the beginning of block E is also zero. Next block F is considered. At the end of block F the one forward path (i.e., block G) has no uses of X, so the liveness bit vector at the end of block F is zero. Note, however, that there is a use of X in block F without a definition of X preceding the use, so the liveness bit vector at the beginning of block F is one. In like manner the rest of the liveness bit vectors for the remaining blocks (i.e., A–D) of FIG. 7 are calculated in turn proceeding up the flow diagram, with the results summarized in Table I below.

TABLE I

Liveness Bit Vectors for Symbolic Register X in Intermediate Language Program of FIG. 7

| Basic Block | END | BEG |
| --- | --- | --- |
| G | 0 | 0 |
| E | 0 | 0 |
| F | 0 | 1 |
| D | 1 | 1 |
| B | 1 | 1 |
| C | 1 | 0 |
| A | 1 | 1 |

According to Chaitin and Briggs, the liveness bit vectors are then used to determine the lifetime (i.e., live range) of symbolic register X. From the information in Table I above, the lifetime for symbolic register X in FIG. 7 would span from the beginning of block A to the use in block F, which would include blocks A, B, and D, and portions of C and F. Note, however, that this lifetime has run away since X is live at the beginning of the program (beginning of block A) when it actually need not be labeled as live until the definition of X in block C. By calculating the lifetime of X according to Chaitin and Briggs, the lifetime of X overlaps blocks A and B, which needlessly adds to the register pressure in blocks A and B by adding needless constraints (i.e., edges) in the interference graph. These additional unneeded edges could lead to inefficiencies in allocating registers during the graph coloring phase by potentially spilling a symbolic register that would have been colorable if the runaway lifetime for X were truncated to not span blocks A and B. Even if registers are not spilled due to the additional unneeded edges, the number of registers used will be more than the minimal number of registers that could be used. When one procedure (P1) calls another procedure (P2), each physical register used by P2 will interfere with all lifetimes in P1 that overlap the call. By minimizing the number of registers used, the pressure caused by such procedure calls may be minimized. By adding needlessly to the number of registers used in P2 due to run-away lifetimes, register pressure is increased when P1 calls P2, resulting in run-time code that executes slower than if the runaway lifetimes were appropriately truncated.

The Chow/Hennessy approach eliminates the problem of runaway lifetimes by performing a second dataflow analysis on the intermediate language program from the top down to calculate the reaching definitions of X. Note that the order of steps in FIG. 6 shows determining reaching definitions (step 610) before determining liveness using upwardly exposed uses (step 510), but the order of these two steps may be reversed without affecting the register allocation scheme. In calculating the values of the reaching definition bit vectors, the appropriate question to ask is whether there is a definition along any path above that reaches down to the particular portion of the block of interest. Starting with block A, the reaching definition (RD) bit vector at the beginning of block A (RDBV0) is a zero, since this is the beginning of the program and, thus, no definitions can precede this point. Working down, the RD bit vector at the end of block A (RDBV1) is also zero since there are no definitions of X in block A. Arbitrarily selecting block B next, the RD bit vector at the beginning (RDBV0) and end (RDBV1) of block B are both zero since there is no upward path that contains a definition of X. The RD bit vector at the beginning of block C (RDBV0) is zero, since there are no definitions of X in block A, but the RD bit vector at the end of block C (RDBV1) is one, since X is defined in block C. The rest of the RD bit vectors are then computed one by one by descending down the flow diagram, with the results summarized in Table II below.

TABLE II

Reaching Definition Bit Vectors for Symbolic Register X in Intermediate Language Program of FIG. 7

| Basic Block | BEG | END |
| --- | --- | --- |
| A | 0 | 0 |
| B | 0 | 0 |
| C | 0 | 1 |
| D | 1 | 1 |
| E | 1 | 1 |
| F | 1 | 1 |
| G | 1 | 1 |

By evaluating Table II, the range of reaching definitions of X spans from the definition in block C to the end of block G, which would include blocks C (after its definition), D, E, F and G. The Chow/Hennessy approach now intersects the range of reaching definitions (definition in C through G) with the liveness range computed above (A through use in F) to determine the lifetime or live range of X (step 620). Thus, X has a live range that spans blocks C (after its definition), D, and F (up to its use). Note that intersecting the reaching definitions with the range of upwardly exposed uses results in truncation of the runaway lifetime of X (i.e., the portion spanning blocks A and B) that would result from the Chaitin and Briggs single-dataflow analysis. The Chow/Hennessy approach thus succeeds in achieving more efficient register allocation than with the Chaitin/Briggs approach. However, this efficiency comes at the expense of increased compilation time caused by performing two separate dataflow analyses for each live range computation rather than the single dataflow analysis performed by Chaitin and Briggs. This additional compilation time is significant given the subsequent stages of compilation that must re-compute the lifetimes of a large number of symbolic registers.

Mechanisms of the Present Invention

The register allocation apparatus and method in accordance with the present invention overcomes the disadvantage of the Chaitin/Briggs approach by truncating runaway lifetimes without performing two dataflow analyses in subsequent compiler stages as required by the Chow/Hennessy approach. Two dataflow analyses are initially performed, during which runaway lifetimes are truncated by the insertion of certain instructions in the intermediate language instruction stream. Subsequent calculations of lifetimes may then be performed by solving a single dataflow problem, knowing that all runaway lifetimes previously have been truncated.

DETAILED DESCRIPTION

Referring to FIG. 1, a computer system 100 in accordance with the present invention is an enhanced IBM AS/400 mid-range computer system. However, those skilled in the art will appreciate that the mechanisms and apparatus of the present invention apply equally to any computer system, regardless of whether the computer system is a complicated multi-user computing apparatus or a single user device such as a personal computer or workstation. Computer system 100 suitably comprises a CPU 110, main memory 120, a memory controller 130, an auxiliary storage interface 140, and a terminal interface 150, all of which are interconnected via a system bus 160. Note that various modifications, additions, or deletions may be made to the computer system 100 illustrated in FIG. 1 within the scope of the present invention such as the addition of cache memory or other peripheral devices; FIG. 1 is presented to simply illustrate some of the salient features of computer system 100.

CPU 110 performs computation and control functions of computer system 100, and comprises a suitable central processing unit with several internal registers 112. The registers 112 within CPU 110 correspond to the physical registers" discussed in the Overview section above. CPU 110 may comprise a single integrated circuit, such as a microprocessor, or may comprise any suitable number of integrated circuit devices and/or circuit boards working in cooperation to accomplish the functions of a central processing unit. CPU 110 suitably executes an instruction stream 124 within main memory 120, and in response thereto acts upon information in physical registers 112.

Auxiliary storage interface 140 is used to allow computer system 100 to store and retrieve information from auxiliary storage, such as magnetic disk (e.g., hard disks or floppy diskettes) or optical storage devices (e.g., CD-ROM). Memory controller 130, through use of a processor separate from CPU 110, is responsible for moving requested information from main memory 120 and/or through auxiliary storage interface 140 to CPU 110. While for the purposes of explanation, memory controller 130 is shown as a separate entity, those skilled in the art understand that, in practice, portions of the function provided by memory controller 130 may actually reside in the circuitry associated with CPU 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main CPU 110 and a single system bus 160, it should be understood that the present invention applies equally to computer systems having multiple main CPUs and multiple system buses. Similarly, although the system bus 160 of the preferred embodiment is a typical hardwired, multidrop bus, any connection means that supports bi-directional communication could be used.

Main memory 120 contains optimizing compiler 122, machine code instruction stream 124, application programs 126, and operating system 128. Within compiler 122 is a register allocation mechanism which allocates physical registers 112 within CPU 110 to instructions in machine code instruction stream 124 in accordance with the present invention. It should be understood that main memory 120 will not necessarily contain all parts of all mechanisms shown. For example, portions of application programs 126 and operating system 128 may be loaded into an instruction cache (not shown) for CPU 110 to execute, while other files may well be stored on magnetic or optical disk storage devices (not shown). In addition, compiler 122 may generate a machine code instruction stream 124 that is intended to be executed on a different computer system if compiler 122 is a cross-compiler.

The remainder of this specification describes how the present invention improves the allocation of physical registers 112 to instructions in machine code instruction stream 124 compared to the Chaitin/Briggs approach and the Chow/Hennessy approach for calculating lifetimes, without paying the computational expense of performing two dataflow analyses each time the lifetime of each symbolic register is needed by a subsequent stage of the compiler. Those skilled in the art will appreciate that the present invention applies equally to any compiler or any instruction stream that may be optimized by representing the relationship between registers as live ranges or lifetimes.

Figure 8:
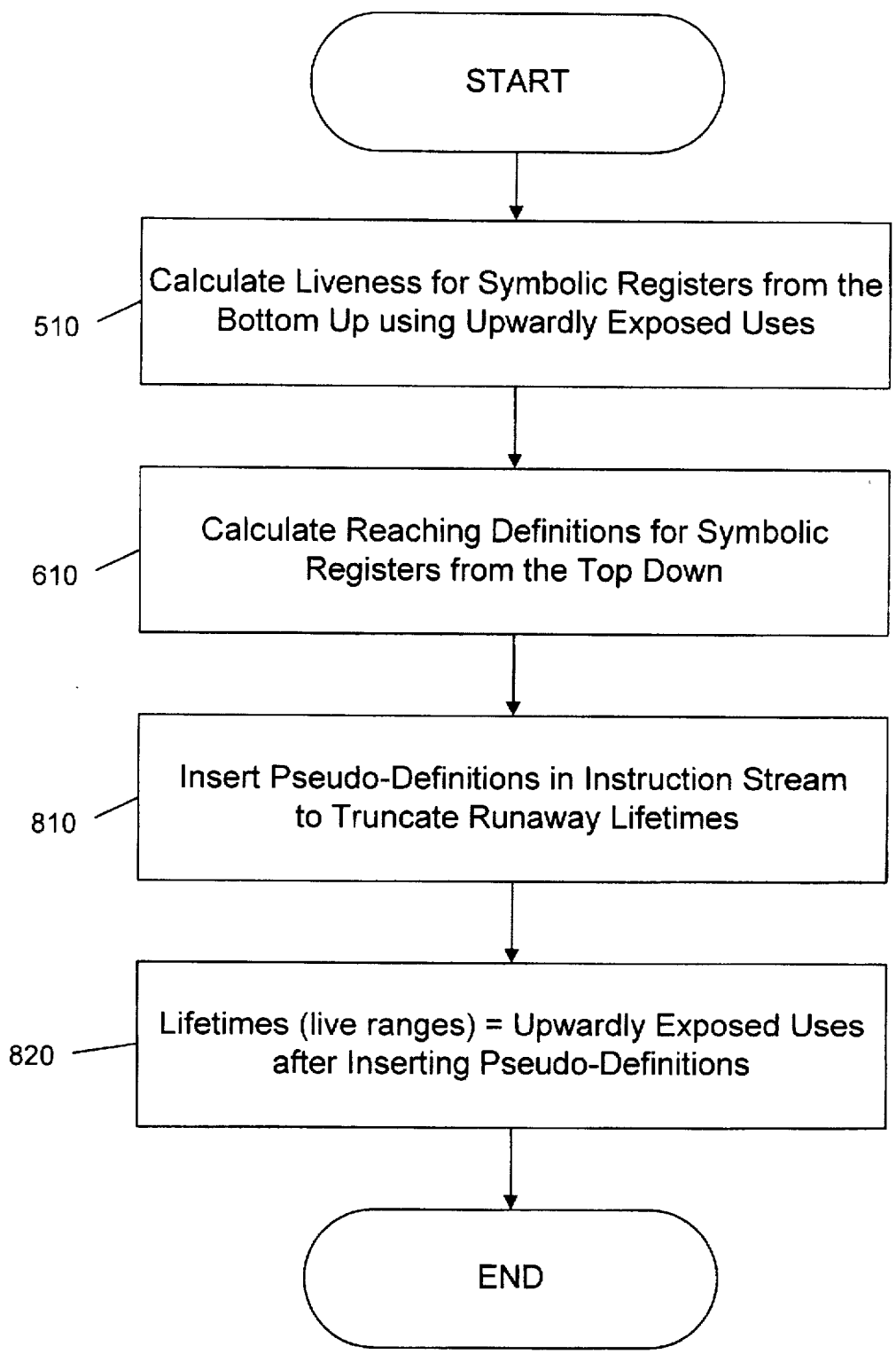
FIG. 8 is a flow diagram of a method for calculating lifetimes of program variables in a register allocation scheme in accordance with the present invention.

Referring to FIG. 8, a method for calculating lifetimes of symbolic registers in accordance with one embodiment of the present invention comprises the steps discussed above of calculating liveness based on upwardly exposed uses (step 510) and calculating reaching definitions (step 610), and additionally comprises the steps of inserting pseudo-definitions into the intermediate language instruction stream to truncate runaway lifetimes (step 810), and defining the lifetimes for the symbolic registers as the upwardly exposed uses after insertion of the pseudo-definitions (step 820). The steps of calculating liveness (step 510) and reaching definitions (step 610) are suitably the same as disclosed above with respect to the discussion of Chaitin/Briggs and Chow/Hennessy, but may also vary from the specific methods discussed if equivalent results are obtained. The apparatus and method in accordance with the present invention, however, uses the data in both the liveness bit vectors and the reaching definition bit vectors to determine where in the program flow that lifetimes run away, and to insert a pseudo-definition into the intermediate language instruction stream to truncate each runaway lifetime (step 810). By inserting pseudo-definitions into the intermediate language instruction stream, the runaway lifetimes are all truncated. This truncation of runaway lifetimes means that the liveness as computed by Chaitin/Briggs based on upwardly exposed uses is equal to the lifetimes of the respective symbolic registers (step 820). This means that, during all subsequent stages of the compiler that require the computation of lifetimes for symbolic registers, the compiler need only perform the single dataflow analysis (similar to Chaitin/Briggs) from the bottom up looking at upwardly exposed uses to determine the lifetimes of all symbolic registers. The apparatus and method of the present invention thus achieves the truncation of runaway lifetimes in a unique manner which essentially exhibits the best features of both the Chaitin/Briggs approach and the Chow/Hennessy approach without the attendant disadvantages of either.

In this context, a pseudo-definition is a special instruction that is inserted into the intermediate language instruction stream for the purpose of truncating the runaway lifetime of a symbolic register. One or more separate pseudo-definitions are required for each symbolic register that has a runaway lifetime. The compiler will generate no machine code instructions for the pseudo-definition. It is for this reason that it is labeled a pseudo"-definition, since it is not a definition of a symbolic register in the traditional sense of an intermediate language program statement that will be translated into machine code. The compiler simply recognizes that, when determining the lifetime of a symbolic register based on upwardly exposed uses, either an actual definition or a pseudo-definition of that symbolic register will serve to terminate the range of the upwardly exposed use, thereby truncating the runaway lifetime (step 820).

While the embodiments herein discuss the insertion of pseudo-definitions in an instruction stream to truncate runaway lifetimes, the present invention in its broadest sense encompasses the insertion of any instruction in the instruction stream which serves to truncate runaway lifetimes. Inserting a pseudo-definition as disclosed herein is the best mode for truncating runaway lifetimes, since no code is generated for the pseudo-definitions by the compiler. However, less efficient methods that insert instructions for which the compiler will generate code are equally within the scope of the present invention.

The method as disclosed in FIG. 8 is the most general case, and is the subject of one embodiment of the present invention. However, various improvements to this general method may significantly enhance the performance of compiler 122, as shown by the flow diagram of FIG. 9 for the preferred embodiment of the present invention.

The first step in accordance with the method of the preferred embodiment calculates lifetimes of all symbolic registers from the bottom up using upwardly exposed uses (step 510), suitably the same step used in the methods of Chaitin/Briggs and Chow/Hennessy. Next, a determination is made whether any of the lifetimes are runaway lifetimes (step 910). This determination may be made by examining the liveness bit vector corresponding to the beginning of the first basic block in the program. If a symbolic register has a runaway lifetime, it will be live" (i.e., its corresponding bit in the bit vector will be a one) at the very beginning of the program. If there are no runaway lifetimes (i.e., answer to step 910 is NO), the lifetimes of all symbolic registers are defined by the upwardly exposed uses (step 520), the same way that lifetimes were defined for the Chaitin/Briggs approach of FIG. 5.

The discussion herein for illustrative purposes considers the specific case of program variables that run away" to the beginning of the program, realizing that other definitions of runaway lifetimes are clearly within the scope of the present invention. For example, a program may have multiple entry points, effectively providing a number of different locations which may serve as the beginning" of the program for purposes of truncating runaway lifetimes.

Figure 9:
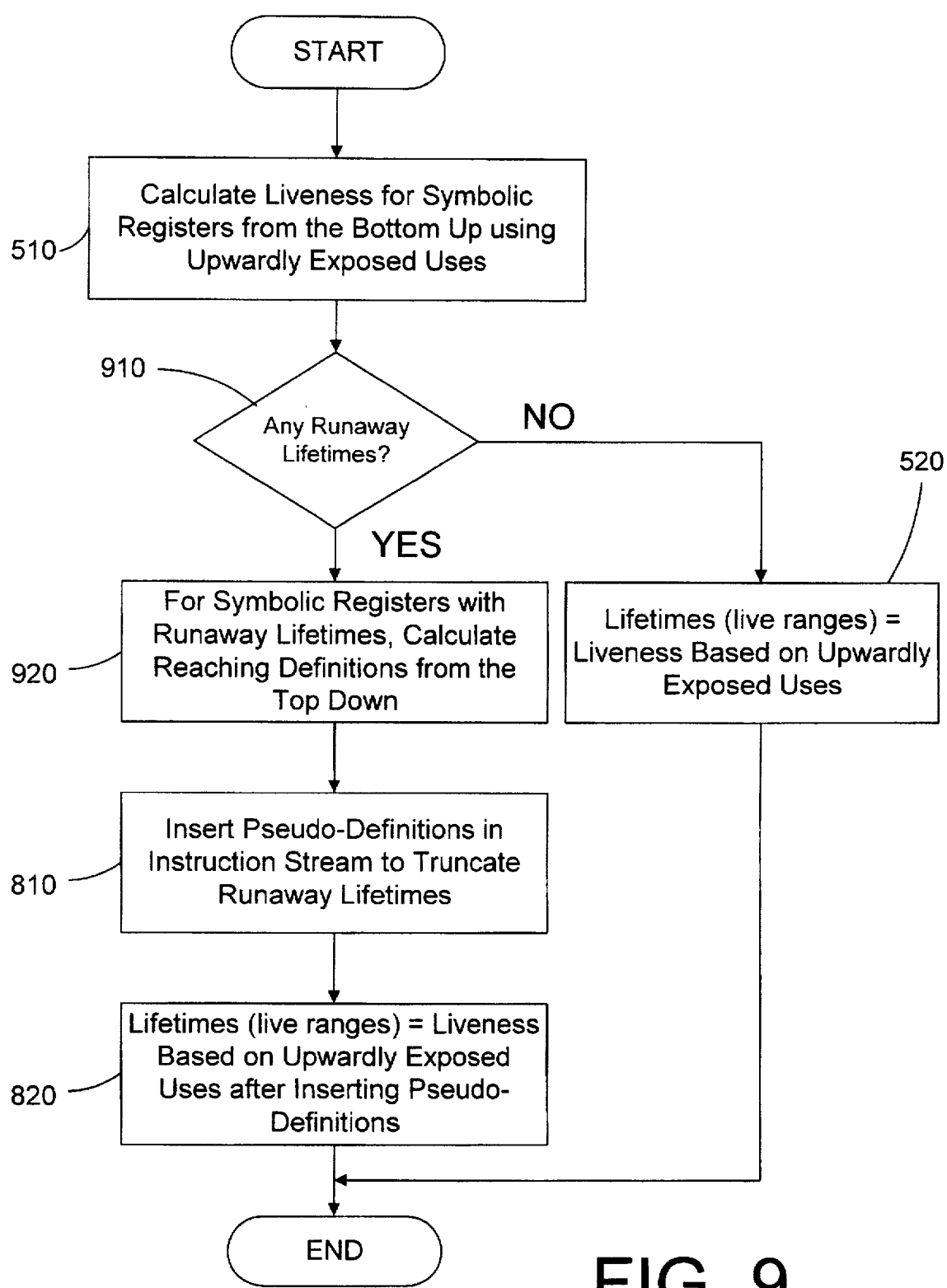
FIG. 9 is a flow diagram of the preferred embodiment of a method for calculating lifetimes of program variables in a register allocation scheme in accordance with the present invention.

If any of the lifetimes are runaway lifetimes (i.e., answer to step 910 is YES), the reaching definitions for only the symbolic registers that have runaway lifetimes are calculated (step 920). Contrast step 920 of FIG. 9 to step 610 of FIGS. 6 and 8. For the Chow/Hennessy approach (FIG. 6) and for the first embodiment (FIG. 8), reaching definitions for all symbolic registers are computed. For the preferred embodiment as shown in FIG. 9, however, only the reaching definitions for symbolic registers with runaway lifetimes are computed. By not computing reaching definitions for the symbolic registers that do not have runaway lifetimes, the time to execute step 920 will generally be significantly less than the time to execute step 810 of FIGS. 6 and 8.

The next step is to insert the pseudo-definitions into the intermediate language instruction stream to truncate the runaway lifetimes (step 810) in the same manner as step 810 in FIG. 8. The final step is to define the lifetimes of the symbolic registers as the upwardly exposed uses after the insertion of the pseudo-definitions (step 820). Any symbolic registers that did not originally have runaway lifetimes are defined by their liveness based on the range of upwardly exposed uses, the same as for step 520. However, for registers that had runaway lifetimes, the runaway portion of the lifetime is truncated by the insertion of the pseudo-definition, with the result that none of the lifetimes of any of the symbolic registers run away after the pseudo-definitions are inserted.

The scope of the present invention expressly encompasses the insertion of pseudo-definitions at any point within the instruction stream to shorten the lifetime of a variable that originally has a runaway lifetime. Many different heuristics may be used to determine the exact number and placement of the pseudo-definitions. In the preferred embodiment, the basic blocks of the program are examined in arbitrary order. For each symbolic register that is live upon entry to a particular basic block of interest (i.e., for each symbolic register that has a 1" in the liveness bit vector corresponding to the beginning of the block), the reaching definition bit vectors corresponding to the end of all predecessor blocks are examined to assure that the symbolic register has a reaching definition in all paths that lead to the basic block of interest. If the symbolic register is not defined along any of the paths that lead to the basic block of interest, and there is a use of the symbolic register in the block of interest, a pseudo-definition can be placed within the block somewhere prior to the use of the symbolic register. If any one of the paths that lead to the basic block of interest do not have a reaching definition for that symbolic register (e.g., the reaching definition bit vector at the end of the predecessor block for that symbolic register is zero), a pseudo-definition is suitably placed at the end of all predecessor basic blocks that do not have a reaching definition.

Figure 10:
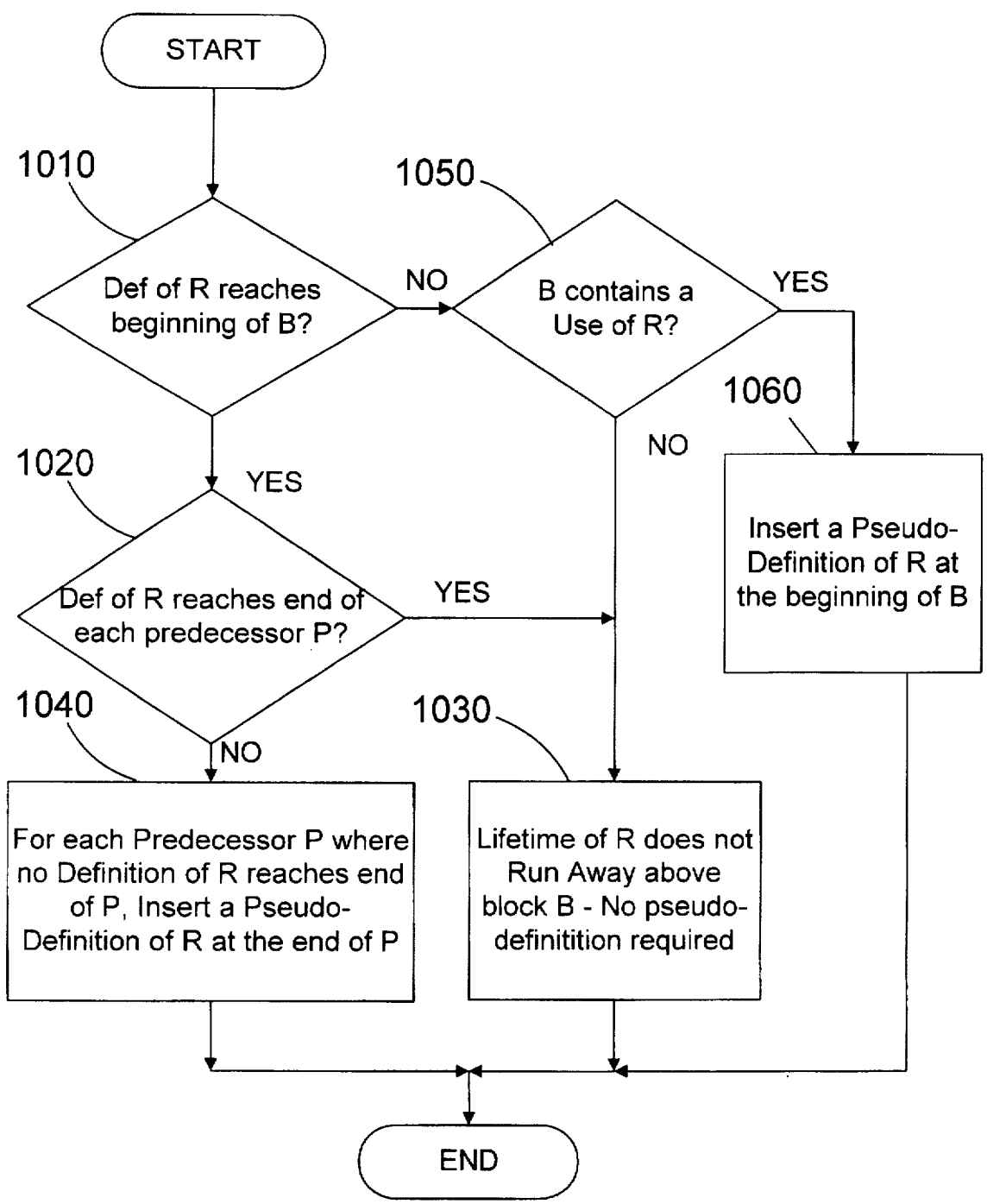
FIG. 10 is a flow diagram of a method for determining the placement of pseudo-definitions within the intermediate language instruction stream to truncate runaway lifetimes.

Referring to FIG. 10, one suitable implementation of the preferred method for determining the location for a pseudo-definition in the intermediate language instruction stream looks at a representative program variable R in a basic block B. The first step is to determine if there is a definition of R that reaches the beginning of block B (step 1010). If there is a reaching definition of R at the beginning of block B (i.e., answer to step 1010 is YES), each predecessor block P is examined to determine whether there is a reaching definition of R at the end of each predecessor block P (step 1020). If there is a reaching definition of R at the end of each predecessor block P (i.e., answer to step 1020 is YES), the lifetime of R does not runaway above block B (step 1030), and no pseudo-definition needs to be inserted. On the other hand, if there exists at least one predecessor block P that has no reaching definition of R at the end of block P (i.e., answer to step 1020 is NO), a pseudo-definition of R is inserted at the end of each predecessor block P where a definition of R does not reach to the end of P (step 1040).

If there is no definition of R that reaches the beginning of block B (Le., answer to step 1010 is NO), block B is examined to determine whether there is a use of R in block B (step 1050). If there is no use of R in block B (i.e., answer to step 1050 is NO), the lifetime of R does not runaway above block B (step 1030), and no pseudo-definition needs to be inserted. On the other hand, if there is a use of R in block B (i.e., answer to step 1050 is YES), a pseudo-definition of R is inserted at the beginning of block B (step 1060). Note that the pseudo-definition could also be placed farther forward within block B, right before the use of R, but this would require greater compile time to determine the exact location. It is easier and saves time to simply insert the pseudo-definition at the beginning of block B. The method of FIG. 10 thus inserts pseudo-definitions at a point that truncates runaway lifetimes above a block where the lifetime first runs away, resulting in a much greater efficiency in subsequent register allocation steps by removing unnecessary constraints (i.e., edges) from the interference graph.

Other alternative embodiments may insert the pseudo-definitions in other locations, such as inserting pseudo-definitions only within a certain type of basic block, such as the first block in a loop or procedure. While various different implementations not discussed herein are possible, the scope of the present invention extends to the truncation of any portion of the live range for any symbolic register that has a runaway lifetime by the insertion of a pseudo-definition into the intermediate language instruction stream.

The present invention thus performs an initial analysis of lifetimes that includes performing two dataflow analyses on the instruction stream, during which runaway lifetimes are truncated by the insertion of instructions (e.g., pseudo-definitions) at appropriate points in the instruction stream. This allows subsequent compiler stages to calculate lifetimes by performing a single dataflow analysis without any concern for runaway lifetimes. This simple yet powerful scheme for calculating live ranges greatly improves the efficiency of register allocation within an optimizing compiler while improving the compilation time of subsequent compiler stages that compute lifetimes of program variables.

While the invention has been particularly shown and described with reference to preferred exemplary embodiments thereof, it will be understood by those skilled in the art that various changes in form and details may be made therein without departing from the spirit and scope of the invention. For example, while the invention herein has been discussed with regard to an intermediate language instruction stream, it is clearly within the scope of the present invention to apply the principles herein to truncate runaway lifetimes of program variables in other contexts, such as performing a pre-processing step that would truncate the runaway lifetime of a source code program variable before the compiler makes its first pass to convert the source code to an intermediate code representation. In addition, while the preferred embodiments discussed herein truncate all runaway lifetimes, it is clearly within the scope of the present invention to truncate a smaller number of runaway lifetimes. And while the discussion herein refers to symbolic registers in an intermediate language instruction stream to illustrate the concepts of the present invention, the present invention also extends to other implementations involving other types of instruction streams and program variables.

We claim:

1. A computer apparatus comprising:
   (A) a central processing unit having a plurality of registers, the central processing unit executing a first instruction stream and in response to the first instruction stream, the central processing unit operates on information stored in the plurality of registers;
   (B) a compiler for generating the first instruction stream from a second instruction stream, the second instruction stream having a plurality of variables, the compiler including:
      a liveness calculator for determining for each of the plurality of variables a first span of the second instruction stream for which a selected one of the plurality of variables is live, wherein the selected variable is live at a first given point in the second instruction stream if the second instruction stream contains along some forward path from the first given point a first instruction that uses the selected variable before encountering a second instruction that defines the selected variable, and wherein the first span defines a lifetime for the selected variable;
      a runaway lifetime detector for determining whether at least one of the plurality of variables is live in at least one predetermined location within the second instruction stream, wherein a variable that is live at the predetermined location has a runaway lifetime; and
      a runaway lifetime truncator for inserting a third instruction into the second instruction stream to eliminate at least one runaway lifetime.

2. The computer apparatus of claim 1 further comprising a register allocator for assigning the plurality of registers within the central processing unit to the plurality of variables based on the lifetimes of the plurality of variables.

3. The computer apparatus of claim 1 wherein the first instruction stream comprises a first intermediate language instruction stream, wherein the second instruction stream comprises a second intermediate language instruction stream, and wherein the plurality of variables comprise a plurality of symbolic registers.

4. The computer apparatus of claim 1 wherein the third instruction comprises a pseudo-definition of one of the plurality of variables that has the runaway lifetime.

5. The computer apparatus of claim 1 wherein the predetermined location comprises the beginning of the second instruction stream.

6. The computer apparatus of claim 1 further comprising a reaching definitions calculator for determining for at least one of the plurality of variables a second span of the second instruction stream for which a selected one of the plurality of variables has a reaching definition, wherein the selected variable has a reaching definition at a second given point in the second instruction stream if the second instruction stream contains along some backward path from the second given point the second instruction that defines the selected variable.

7. The computer apparatus of claim 6 wherein the second instruction stream is divided into a plurality of basic blocks, and wherein the liveness calculator computes liveness for at least one of the plurality of variables at the beginning and at the end of each of the plurality of basic blocks, and wherein the reaching definitions calculator computes reaching definitions for at least one of the plurality of variables at the beginning and at the end of each of the plurality of basic blocks.

8. A computer apparatus for generating a first instruction stream executable on a central processing unit from a second instruction stream, the second instruction stream having a plurality of variables, the computer apparatus comprising:
   a liveness calculator for determining for each of the plurality of variables a first span of the second instruction stream for which a selected one of the plurality of variables is live, wherein the selected variable is live at a first given point in the second instruction stream if the second instruction stream contains along some forward path from the first given point a first instruction that uses the selected variable before encountering a second instruction that defines the selected variable, and wherein the first span defines a lifetime for the selected variable;

a runaway lifetime detector for determining whether at least one of the plurality of variables is live in at least one predetermined location within the second instruction stream, wherein a variable that is live at the predetermined location has a runaway lifetime; and a runaway lifetime truncator for inserting a third instruction into the second instruction stream to eliminate at least one runaway lifetime.

9. The computer apparatus of claim 8 further comprising a register allocator for assigning the plurality of registers within the central processing unit to the plurality of variables based on the lifetimes of the plurality of variables.

10. The computer apparatus of claim 8 wherein the first instruction stream comprises a first intermediate language instruction stream, wherein the second instruction stream comprises a second intermediate language instruction stream, and wherein the plurality of variables comprise a plurality of symbolic registers.

11. A program product comprising:

a recordable media; and a compiler recorded on the recordable media, the compiler being used to generate a first instruction stream executable on a central processing unit in a computer apparatus from a second instruction stream, the second instruction stream having a plurality of variables, the compiler including:

a liveness calculator for determining for each of the plurality of variables a first span of the second instruction stream for which a selected one of the plurality of variables is live, wherein the selected variable is live at a first given point in the second instruction stream if the second instruction stream contains along some forward path from the first given point a first instruction that uses the selected variable before encountering a second instruction that defines the selected variable, and wherein the first span defines a lifetime for the selected variable;

a runaway lifetime detector for determining whether at least one of the plurality of variables is live in at least one predetermined location within the second instruction stream, wherein a variable that is live at the predetermined location has a runaway lifetime; and a runaway lifetime truncator for inserting a third instruction into the second instruction stream to eliminate at least one runaway lifetime.

12. The computer apparatus of claim 11 further comprising a register allocator for assigning the plurality of registers within the central processing unit to the plurality of variables based on the lifetimes of the plurality of variables.

13. The computer apparatus of claim 11 wherein the first instruction stream comprises a first intermediate language instruction stream, wherein the second instruction stream comprises a second intermediate language instruction stream, and wherein the plurality of variables comprise a plurality of symbolic registers.

14. A method for determining the lifetimes of a plurality of variables within an instruction stream, comprising the steps of:

calculating at least one liveness bit vector corresponding to whether each of the plurality of variables is live at a particular location in the instruction stream, wherein the selected variable is live if the instruction stream contains along some forward path a first instruction that uses the selected variable before encountering a second instruction that defines the selected variable, and wherein a first span of the instruction stream for which the selected variable is live defines a lifetime for the selected variable;

determining from at least one of the liveness bit vectors whether at least one of the plurality of variables is live in at least one predetermined location within the second instruction stream, wherein a variable that is live at the predetermined location has a runaway lifetime; and inserting at least one instruction into the instruction stream for truncating at least one of the runaway lifetimes.

15. The method of claim 14 further comprising the step of calculating at least one reaching definition bit vector for at least one of the plurality of variables that has a runaway lifetime, and inserting the at least one instruction based on the information contained within the at least one liveness bit vector and the at least one reaching definition bit vector.

16. The method of claim 14 wherein the step of inserting at least one instruction into the instruction stream comprises the step of inserting a pseudo-definition of at least one of the variables that has a runaway lifetime.

17. The method of claim 14 wherein the plurality of variables comprise a plurality of symbolic registers within the instruction stream.

18. The method of claim 14 further including the steps of:

dividing the second instruction stream into a plurality of basic blocks;

computing a liveness bit vector at the beginning and at the end of each of the plurality of basic blocks, each liveness bit vector including an indication of the liveness for at least one of the plurality of variables;

computing a reaching definitions bit vector at the beginning and at the end of each of the plurality of basic blocks, each reaching definitions bit vector including an indication of the reaching definition for at least one of the plurality of variables.

19. A computer implemented method for allocating a plurality of registers within a central processing unit to a plurality of variables within an instruction stream, comprising the steps of:

determining a plurality of lifetimes for the plurality of variables;

determining whether any of the lifetimes are runaway lifetimes by determining whether any of the plurality of variables are live at the beginning of the instruction stream;

truncating at least one runaway lifetime by inserting an instruction into the instruction stream;

building an interference graph with a plurality of nodes and a plurality of edges, each live range corresponding to one of the plurality of nodes in the interference graph, the edges of the interference graph representing interferences between nodes; and coloring the interference graph with a number of colors not to exceed the number of the plurality of registers within the central processing unit.

20. A method for distributing a program product comprising the steps of:

initiating a connection between a first computer system and a second computer system;

transmitting the program product from the first computer system to the second computer system, the program product being a compiler, the compiler being used to generate a first instruction stream from a second instruction stream, the second instruction stream having a plurality of variables, the compiler including a liveness calculator for determining for each of the plurality of variables a first span of the second instruction stream for which a selected one of the plurality of variables is live, wherein the selected variable is live at a first given point in the second instruction stream if the second instruction stream contains along some forward path from the first given point a first instruction that uses the selected variable before encountering a second instruction that defines the selected variable, and wherein the first span defines a lifetime for the selected variable, and wherein the compiler further comprises a runaway lifetime detector for determining whether at least one of the plurality of variables is live in at least one predetermined location within the second instruction stream, wherein a variable that is live at the predetermined location has a runaway lifetime, and wherein the compiler further comprises a runaway lifetime truncator for inserting a third instruction into the second instruction stream to eliminate at least one runaway lifetime.

* * * * *